Figures 1, 2:
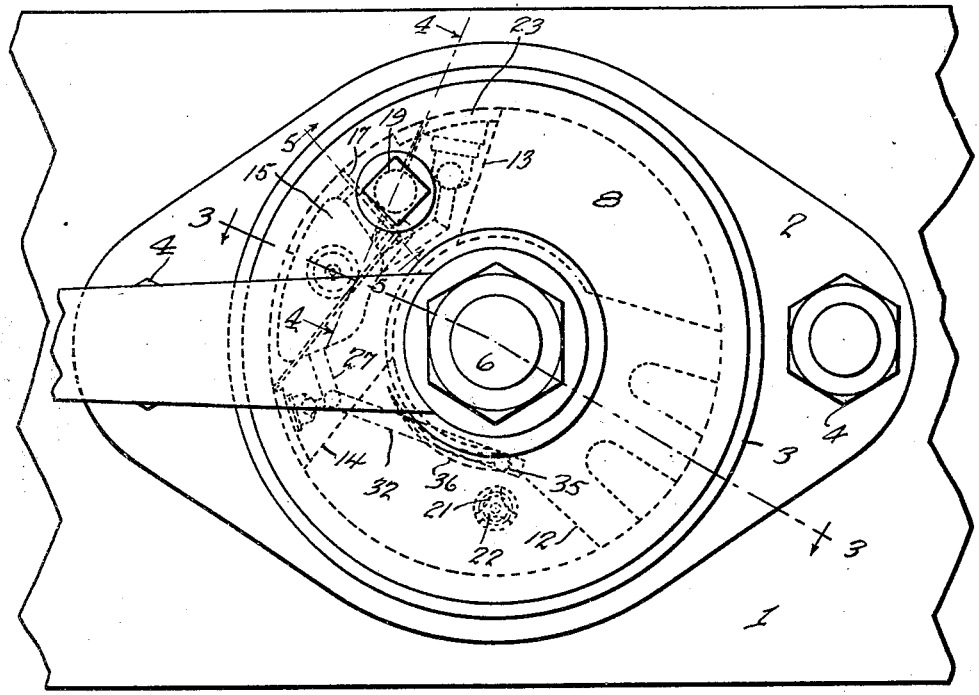

March 14, 1933. E. L. BEECHER 1,901,839
SHOCK ABSORBER
Filed Oct. 4, 1930 2 Sheets-Sheet 1

INVENTOR
Eugene L. Beecher
BY Hull, Brock & West,
ATTORNEYS

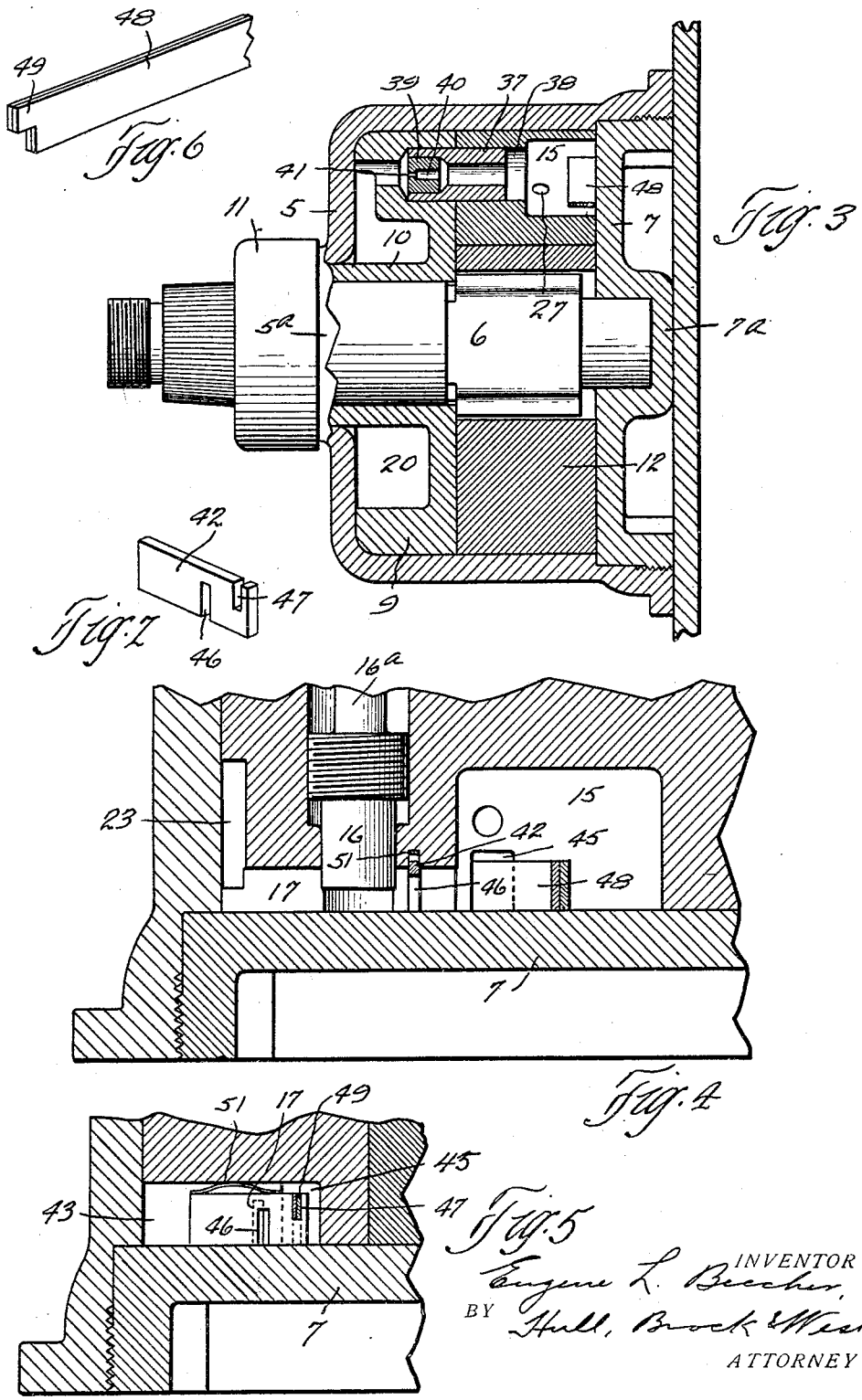

Patented Mar. 14, 1933

1,901,839

UNITED STATES PATENT OFFICE

EUGENE L. BEECHER, OF EAST CLEVELAND, OHIO, ASSIGNOR TO THE GABRIEL COMPANY, OF CLEVELAND, OHIO, A CORPORATION OF OHIO

SHOCK ABSORBER

Application filed October 4, 1930. Serial No. 486,392.

This invention relates to shock absorbers, and more particularly to shock absorbers of the type wherein a vane of movable partition is connected to a shaft by means of which the vane is moved in a liquid-containing working chamber toward and from opposite portions of a partition.

The general purpose and object of the invention is to provide a cheap and effective thermostatic control for the metering by-pass port, located in said partition, and through which port the liquid passes from one side of the working chamber to the other side thereof, through said partition, on the rebound movements of the vehicle.

A further object of the invention is to so locate the thermostatic controlling element that it will be subjected on all sides to a balanced pressure, whereby the said element will be affected only by temperature changes, irrespective of pressure conditions in the liquid.

A still further object is to locate the said element so that it will not be subjected to the maximum pressures which are produced in the operation of the shock absorber.

A still further object of the invention is to provide for the by-pass port a valve which can operate in conjunction with a manually operated adjusting valve and which valve is operated by the thermostatic element.

A still further object is to provide for such by-pass port a thermostatically operated slide valve and to so locate the same that the intermittent hydraulic pressures to which the valve is subjected are effectively greater at approximately right angles to the direction of motion of said valve, whereby movements of the said valve are prevented during high pressure cycles of the liquid.

A still further object is to construct the slide valve and locate the same in such manner that the ends thereof will be subjected to a balanced pressure.

I accomplish the foregoing objects in and through the construction and arrangement of parts shown in the drawings hereof, wherein Fig. 1 represents a front elevation of a shock absorber with which my invention is incorporated; Fig. 2 is a detail in vertical section taken through the casing and the partition and looking toward the front of the shock absorber; Fig. 3 a sectional view corresponding to the line 3—3 of Fig. 1; Figs. 4 and 5 are details in section corresponding respectively to the lines 4—4 and 5—5 of Fig. 2; Fig. 6 a detail in elevation of one end of the thermostatic bar; and Fig. 7 a detail in perspective of the gate valve.

Describing the invention by reference characters, 1 denotes one of the side members of an automobile to which the base flange 2 of a cylindrical casing 3 is secured, as by means of bolts 4. The casing is provided with an integral cover 5 having an opening therethrough for the passage of the shaft 6, the inner or rear end of the shaft being journaled in a suitable bearing 7ª provided therefor in the base plate 7, which is threaded into the bottom of the casing.

The working chamber 8 is provided in front of the base plate 7 and between the same and a cover block 9 having a neck 10 surrounding the shaft 6 and extending into a neck 5ª carried by the cover 5. Suitable packing (not shown) is inserted in the joints between the two necks and between the neck 10 and the shaft, the packing being retained in place by any suitable means, including a cap 11.

Mounted on the shaft 6 in the working chamber is a piston in the form of a vane 12 which is movable in said chamber toward and from opposite branches 13 and 14 of a segmental partition having a chamber 15 therein.

Mounted in the branch 13 is a valve 16 which controls the passage of liquid through a slotted by-pass port 17 and thence through the chamber 15 and the opposite branch of the partition. This valve is provided with a stem 16ª which projects through the cover block 9 and is accessible for adjustment through the removal of the plug 19 which provides for the replenishing of liquid in the reserve chamber 20 formed between the cover block and the cover 5.

The cover block is provided with a port (not shown) controlled by a valve 21 for the admission of liquid from the reserve chamber to the working chamber, the cage for the valve being shown at 22. One end of the port 17 communicates with a peripheral port 23 in the partition branch 13 and this peripheral port also communicates with a chamber 24 having a check valve 25 therein which in turn cooperates with a passage 26 which communicates at its opposite end with the chamber 15. 27 denotes a passage in the branch 14 of the partition, which passage communicates at one end with the chamber 15 and at its opposite end with a port 28 which in turn communicates with a chamber 29 containing a check valve 30. The chamber 29 in turn communicates with a peripheral port or passage 31 formed in the partition branch 14. If desired, an additional passage 32 may be provided in the cover block 10 which communicates at one end with the passage 24 through a port 33 and which communicates with the impact portion of the working chamber through a port 35 communicating with a tapered port 36 in the top of the cover block and which is adapted to be covered more or less by the vane piston 12 as it moves toward the branch 14. This particular arrangement of ports is shown, described and claimed in my copending application Serial No. 422,519, filed January 22, 1930 and, in its details, forms no part of the invention sought to be protected hereby. As is the case with the form of my invention shown in my application aforesaid, I have provided means for the escape of air from the working chamber into the upper portion of the compensating or reserve chamber 20, this means consisting generally of a tubular dowel 37 mounted in a chambered seat 38 in the partition, the seat and the bore of the dowel communicating with the chamber 15 and the dowel having therein a plug 39 provided with a central bore 40 communicating at one end with the tubular passage of the dowel and at its outer end with a capillary passage 41 in said plug which in turn communicates with the reserve chamber 20.

As is well known to those conversant with the operation of shock absorbers of the hydraulic type, the resistance to the movement of the piston or vane varies with the viscosity of the liquid of the working chamber, and this viscosity in turn varies with the temperature of the liquid, being greater at low temperatures and lower at high temperatures. In order to maintain the resistance to movements of the vane substantially constant, irrespective of variations in temperature and without the necessity for manual adjustment of the valve 16, I have provided the following construction: 42 denotes a sliding gate valve which is mounted in a slot 43 in the partition branch 13 and which slot intersects at substantially right angles to said port the slotted port 17. The slot 43 communicates with the chamber 15 by means of a port 44 located beyond one end of the sliding gate while the opposite end of the sliding gate projects into a port 45 which also communicates with the chamber 15. The gate is provided with a notched port 46 which is adapted, when the temperature of the liquid is low, to register fully with the slotted port 17. The end of the valve which projects into the port 45 is provided with a notch 47 which receives therewithin the adjacent end 49 of a bi-metal thermostat bar 48. This bar rests upon the base plate 7, with its end opposite the end 49 staked into a slot 50 extending into the partition branch 14 from the chamber 15, the major portion of the bar being located in the chamber 15 and the port 45. It will be noted from Fig. 5 that the slot 43 which is formed in the partition branch 13 is deeper than the width of the valve 42 and that the valve is yieldingly held against the base plate 7 by an arched spring 51 bearing at its center against the top of the slot and at its ends upon the adjacent edge of the valve. It will be noted further that the slot 46 in the gate valve 42 is of greater width than the port 17, but is of less height than said port, so that the pressure exerted directly against the gate valve by the liquid flowing through the slot 17 is always greater than the force to which the ends of the valve are subjected, due to the fact that such ends are subjected to the pressure which exists in the intermediate chamber 15. It will be noted further that the pressure to which the ends of the gate valve are subjected is a balanced pressure, due to the ports 44 and 45; also that the bi-metal strip constituting the thermostat is so narrow that all of its surfaces are exposed to the relatively low pressure of the liquid in the intermediate chamber 15, with the exception of the portion which is staked into the slot 50.

With the parts constructed and arranged as described, the operation will be readily understood. The port 17 through which the liquid is forced on rebound is normally partially restricted by the metal adjacent to one edge of the notch or slot 46 in the valve 42, the amount of such restriction being predetermined by a basic low temperature and the manually operated valve 16 being adjusted to this temperature condition. As the temperature of the fluid increases, due to the forcing of the liquid through the restricted openings, the bar 48 is distorted in a direction to move the slide valve to restrict further the flow of fluid by decreasing the cross-sectional area of the metering port 17 proportionately to such increasing temperature. Should the liquid be at a lower temperature than the basic low temperature, the gate valve will be moved in the opposite direction beyond such original position, thereby to increase the effective cross-sectional area of the metering port 17.

The construction and arrangement of the valve 42 are such that, during a pressure cycle, the liquid in the port 17 will hold it against movement. Furthermore, because of the fact that the notch 46 is of less height than the height of the port 17 the pressure exerted against the side of the valve is greater than that exerted in the plane of movement of said valve.

If desired, the width of the port 45 may be proportioned so that the opposite walls thereof may constitute stops limiting the movement of the valve 42 by the thermostat bar. Furthermore, while I have shown my thermostatically operated valve as employed in conjunction with the manually operated valve 16, I do not propose to limit myself to the employment of the thermostatic control with installations containing additional valves, whether adjusted manually or otherwise.

Having thus described my invention, what I claim is:—

1. A shock absorber comprising in combination a liquid containing chamber, a piston in said chamber, a partition in said chamber toward and from which the said piston is moved, said partition being provided with a chamber intermediate the sides thereof, means including a metering port in said partition for permitting the flow of liquid from one end of the first mentioned chamber through said partition and through the chamber in said partition to the opposite end of the first mentioned chamber, a slide valve movable across the said port, there being ports communicating with said second chamber and subjecting the opposite ends of the slide valve to the pressure of the liquid therein, and a thermostat located in the second chamber and connected with said valve.

2. A shock absorber comprising in combination a liquid containing chamber, a piston in said chamber, the said chamber having walls toward and from which the said piston is moved and there being a chamber intermediate the said walls, means including a metering port for permitting the flow of liquid from one end of the first mentioned chamber through said walls and through the chamber therebetween to the opposite end of the first mentioned chamber, a slide valve movable across the said port, there being ports communicating with said second chamber and subjecting the opposite ends of the slide valve to the pressure of the liquid therein, and a thermostat connected with said valve and subjected to the temperature of the liquid.

3. A shock absorber comprising in combination a liquid containing chamber, a piston in said chamber, a partition in said chamber toward and from which the said piston is moved, said partition being provided with a chamber intermediate the sides thereof, means including a metering port in said partition for permitting the flow of liquid from one end of the first mentioned chamber through said partition and through the chamber in said partition to the opposite end of the first mentioned chamber, a slide valve having an opening intermediate the ends thereof adapted to register with the said port and to move across said port, said partition being provided with ports communicating with the chamber therein and subjecting the opposite ends of the slide valve to the pressure of the liquid in such chamber and a thermostatic bar having one end mounted in said partition and having its body located within the chamber in said partition and having its opposite end extending into one of the two last-mentioned ports and operatively connected with the end of said valve in such port.

4. A shock absorber comprising in combination a liquid containing chamber, a piston in said chamber, the said chamber having walls toward and from which the said piston is moved, there being a chamber intermediate the said walls, means including a metering port for permitting the flow of liquid from one end of the first mentioned chamber through said walls and through the chamber therebetween to the opposite end of the first mentioned chamber, a slide valve having an opening intermediate the ends thereof adapted to register with the said port and to move across said port, there being ports communicating with such intermediate chamber and subjecting the opposite ends of the slide valve to the pressure of the liquid in such chamber, and a thermostatic bar located within the intermediate chamber and operatively connected with said valve.

5. A shock absorber comprising in combination a liquid containing chamber, a piston in said chamber, a partition in said chamber toward and from which the said piston is moved, the said partition having a chamber intermediate the sides thereof and being provided with a metering port communicating at one end with the rebound side of the first mentioned chamber and at its opposite end with the chamber in said partition, there being a port also communicating with the chamber in the partition and with the impact end of the first mentioned chamber, a sliding valve movable at substantially right angles across the said metering port and having an opening intermediate the ends thereof adapted to register with said port, and a thermostatic bar having one end mounted in said partition and having the body thereof within the liquid in the chamber in said partition and having its opposite end connected with said valve.

In testimony whereof, I hereunto affix my signature.

E. L. BEECHER.